(12) United States Patent
Stull

(10) Patent No.: US 8,895,150 B1
(45) Date of Patent: *Nov. 25, 2014

(54) COATED GLASS SURFACES AND METHOD FOR COATING A GLASS SUBSTRATE

(71) Applicant: Apogee Enterprises, Inc., Minneapolis, MN (US)

(72) Inventor: Randy Leland Stull, Owatonna, MN (US)

(73) Assignee: Apogee Enterprises, Inc., Minneapolis, MN (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/035,684

(22) Filed: Sep. 24, 2013

Related U.S. Application Data

(63) Continuation of application No. 12/611,751, filed on Nov. 3, 2009, now Pat. No. 8,574,718.

(60) Provisional application No. 61/111,237, filed on Nov. 4, 2008.

(51) Int. Cl.
*B32B 15/04* (2006.01)
*B32B 17/06* (2006.01)
*C23C 14/06* (2006.01)
*C23C 14/22* (2006.01)

(52) U.S. Cl.
USPC .......... 428/432; 428/433; 428/689; 428/699; 428/701; 428/702; 204/192.1; 204/192.15

(58) Field of Classification Search
USPC ......... 428/216, 428, 432, 433, 434, 469, 689, 428/699, 701, 702; 204/192.1, 192.15
See application file for complete search history.

(56) References Cited

U.S. PATENT DOCUMENTS

| | | | |
|---|---|---|---|
| 4,900,633 A * | 2/1990 | Gillery | 428/432 |
| 4,902,081 A | 2/1990 | Huffer | |
| 5,298,048 A * | 3/1994 | Lingle et al. | 65/60.2 |
| 5,318,685 A | 6/1994 | O'Shaughnessy | |
| 5,563,734 A * | 10/1996 | Wolfe et al. | 359/360 |
| 5,643,349 A | 7/1997 | Piper et al. | |
| 5,834,103 A | 11/1998 | Bond et al. | |
| 6,060,178 A | 5/2000 | Krisko | |
| 6,231,999 B1 | 5/2001 | Krisko | |

(Continued)

FOREIGN PATENT DOCUMENTS

| | | |
|---|---|---|
| EP | 0 622 645 | 11/1994 |
| WO | WO 01/38249 | 5/2001 |
| WO | WO 2006/122900 | 11/2006 |
| WO | WO 2009/114493 | 9/2009 |

OTHER PUBLICATIONS

INCONEL® alloy 600, Special Metals www.specialmetals.com , publication No. SMC-027, pp. 1-6, Sep. 2008.

(Continued)

*Primary Examiner* — David Sample
*Assistant Examiner* — Lauren Colgan
(74) *Attorney, Agent, or Firm* — Dorsey & Whitney, LLP

(57) ABSTRACT

A substrate having a coating is disclosed. The coating is formed of a plurality of layers. At least one of the layers includes a super alloy and at least two additional layers including silver. A coating for a substrate is also disclosed. A method of applying a coating to a substrate is further disclosed.

20 Claims, 5 Drawing Sheets

(56) References Cited

U.S. PATENT DOCUMENTS

| | | |
|---|---|---|
| 6,316,111 B1 | 11/2001 | Krisko |
| 6,652,974 B1 | 11/2003 | Krisko |
| 6,660,365 B1 | 12/2003 | Krisko et al. |
| 6,802,943 B2 * | 10/2004 | Stachowiak ............. 204/192.22 |
| 6,838,159 B2 | 1/2005 | Eby et al. |
| 6,919,133 B2 * | 7/2005 | Hartig et al. .................. 428/428 |
| 6,964,731 B1 | 11/2005 | Krisko et al. |
| 6,974,629 B1 | 12/2005 | Krisko et al. |
| 7,037,589 B2 | 5/2006 | Hartig et al. |
| 7,063,893 B2 | 6/2006 | Hoffman |
| 7,067,195 B2 | 6/2006 | Hoffman et al. |
| 7,122,252 B2 | 10/2006 | Hoffman |
| 7,138,182 B2 | 11/2006 | Krisko et al. |
| 7,157,123 B2 | 1/2007 | Hartig |
| 7,241,506 B2 | 7/2007 | Hartig |
| 7,309,527 B2 | 12/2007 | O'Shaughnessy et al. |
| 7,339,728 B2 | 3/2008 | Hartig |
| 7,419,729 B2 | 9/2008 | Ewasko et al. |
| 2005/0025982 A1 | 2/2005 | Krisko et al. |
| 2007/0009745 A1 | 1/2007 | Hoffman |
| 2007/0009747 A1 * | 1/2007 | Medwick et al. ............. 428/432 |
| 2007/0102291 A1 | 5/2007 | Hartig |
| 2007/0248756 A1 | 10/2007 | Krisko et al. |
| 2007/0281171 A1 * | 12/2007 | Coster et al. .................. 428/432 |
| 2008/0311389 A1 * | 12/2008 | Roquiny et al. ............... 428/336 |
| 2009/0176086 A1 * | 7/2009 | Martin et al. ................. 428/332 |
| 2009/0233037 A1 * | 9/2009 | Medwick et al. ............... 428/68 |
| 2009/0233071 A1 * | 9/2009 | Medwick et al. ............. 428/216 |
| 2010/0062245 A1 * | 3/2010 | Martin et al. ................. 428/336 |
| 2010/0221575 A1 * | 9/2010 | Stull ............................. 428/680 |

OTHER PUBLICATIONS

Medwick, Paul A., U.S. Appl. No. 61/035,587, filed Mar. 11, 2008, "Solar Mirror".

Examination and Search Report dated Feb. 18, 2014, in corresponding Chilean Patent Application No. 1000-2011.

* cited by examiner

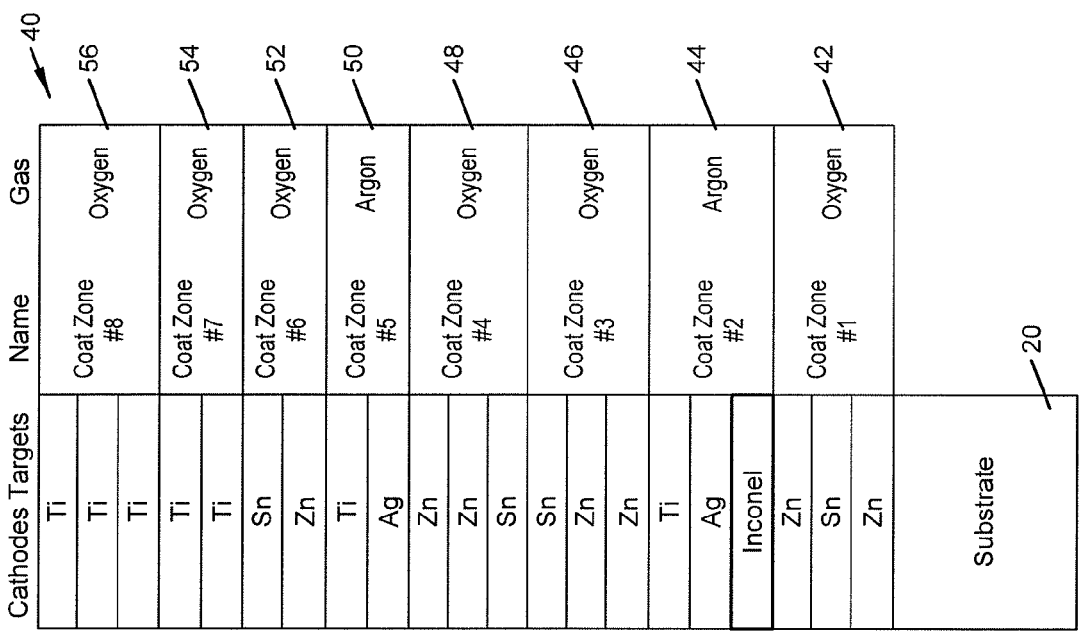
FIG. 1
FIG. 2
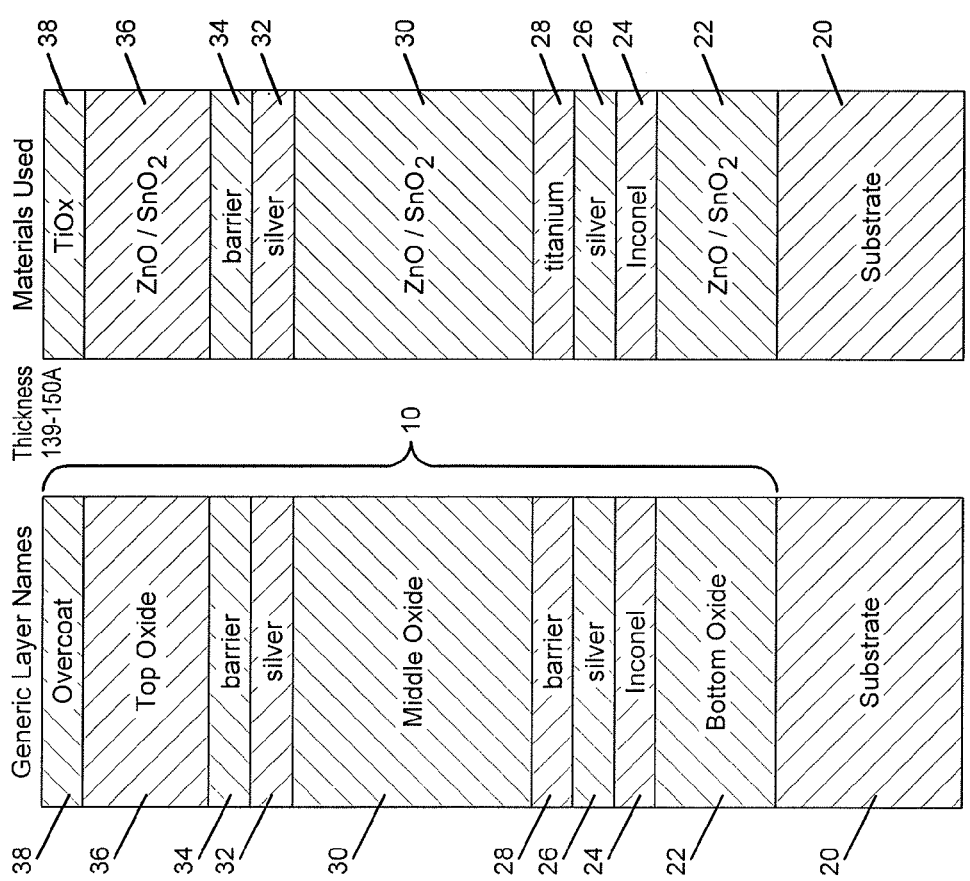
FIG. 3

COATED GLASS SURFACES AND METHOD FOR COATING A GLASS SUBSTRATE

FIELD OF THE INVENTION

The present invention relates to coatings for substrates or substrate surfaces.

BACKGROUND

Advances in window technology have reduced energy consumption by affecting and improving heating, cooling and lighting. Optimal windows can accept solar gain and provide net heating. Optimization may come from coatings for windows or glass. Various types of coatings have been developed. Examples include solar control coatings that reflect across the whole spectral range to reduce glare or overheating from the sun, and low-emissivity coatings which reduce radiative heat losses often accounting for significant heat transfer through a window.

Low-emissivity coatings are well known. The coatings generally have a high reflectance in the thermal infrared (IR) and a high transmittance in the visible spectrum. Thus, they are low-emissive of thermal infrared. Some such coatings may admit solar near IR (NIR) to help heat a building, such as in a cold climate. Some such coatings may reflect the NIR back, such as in a warm climate. The low-emissivity optical properties are generally obtained by application of a material with certain intrinsic properties or alternatively, multiple materials may be combined to achieve the particular desired performance. One example of a material with relevant intrinsic properties, namely high transmittance and low-emissivity, may be doped oxides of tin or indium, wherein adjusting the dopant level can tune the wavelength cutoff between transmittance and reflectance.

Another class of materials suitable for use in providing low-emissivity includes very thin films of metals. Thin films forming infrared-reflection film are generally a conductive metal such as silver, gold or copper. Films of silver are highly reflective. The reflectance of very thin films can be suppressed by thin-film interference effects. For example, adding dielectric layers to the front and back of the metal layer reduces the reflectance of the thin film for a limited range of wavelengths. Coatings including these materials can be made highly transparent to visible radiation or light, but remain reflective in the NIR. These coatings often include one or two layers of infrared-reflection film and two or more layers of transparent dielectric film. The infrared-reflection film reduces the transmission of heat through the coating. The dielectric film is generally used to anti-reflect the infrared-reflection film and to control other properties and characteristics of the coating, such as color and durability. Such films typically have Light to Solar Gain Ratio (LSG) (visible Light Transmittance divided by the Solar Heat Gain Coefficient) ratios of >1.5. The Solar Heat Gain Coefficient is a measure which expresses the proportion of incident solar thermal radiation that is transmitted by a window. Visible Transmittance describes the amount of visible light that can pass. Each of these can be independently altered by different coatings.

Common low-emissivity coatings have one or two silver layers each sandwiched between two coats of transparent dielectric film. In order to obtain improved performance, some current systems and devices employ triple silver coatings or use a barrier as an absorbing layer. By increasing the number of silver films, the infrared reflection can be increased. Unfortunately, increasing the number of silver films also reduces visible light transmission and can negatively affect the color of the coating or decrease durability of the coating. For example, triple silver coatings have a dominant green appearance that is undesirable. Moreover, it is difficult to control the color of the coating, which can lead to color inconsistency.

Accordingly, a coating for a glass substrate is provided which provides improved performance, color control or improvement, and ease of manufacture over currently available coatings and devices.

SUMMARY OF THE INVENTION

A substrate comprising a coating is provided. The coating is formed of a plurality of layers. At least one of the layers includes an alloy or super alloy. At least two additional layers are provided including silver.

A coating for a substrate is also provided. The coating includes an alloy or super alloy layer, a first silver layer, and a second silver layer.

A method of coating a substrate is further provided. The method includes the steps of forming a coating by applying a first layer to a substrate by sputtering, the first layer including an alloy or super alloy. A second layer is applied to the substrate by sputtering, the second layer including a silver material. A third layer is also applied to the substrate by sputtering, the third layer including a metal, wherein the first, second and third layers form at least a portion of a coating for the glass substrate.

The foregoing coating and method provide advantages over currently available devices. By use of an alloy or super alloy such as, for example, a nickel-chromium-molybdenum alloy or super alloy, transmission through a substrate can be attenuated. More specifically, a high reflectance in the thermal infrared (IR) and a high transmittance in the visible spectrum may be obtained. The coating on the substrate surface formed of low-emissive material may reflect a significant amount of radiant heat, thus lowering the total heat flow through the substrate. The low-emissive coating may also be arranged to allow for high solar gain, for moderate solar gain, or for low solar gain, by varying the amount of visible light and/or radiation permitted to pass through the substrate. The coating offers significant improvements in solar heat gain/visible light ratios. For example, the coating, when built to an inner surface, such as the #2 surface of an insulating glass substrate, may include a visible light transmission in the range of about 20% to about 50%. The coating also provides ease of manufacturing and ease of control of the color of the coating as compared to other coatings with comparable performance.

The coating layer system may also minimize the potential for color inconsistency when viewed perpendicular to the glass surface or at acute angles. For example, a coated article may be provided. The coated article may include a substrate having a pair of major surfaces and a coating applied to at least one of the major surfaces. The coating may include a plurality of layers. The color coordinate values of the coated article from a direction that is substantially normal to the coated major surface may be substantially equal to the color coordinate values from directions that are acute to the coated major surface. In addition, or alternatively, the variation in color coordinate values of the article from a direction that is substantially normal to the coated major surface to the color coordinate values from directions that are acute to the coated major surface may be reduced relative to known coated articles. To this end, the coating appeals to a wide range of designs and building applications. Other advantages and features may become apparent from the following description, drawings, and claims.

BRIEF DESCRIPTION OF THE DRAWINGS

FIG. 1 is a diagram illustrating the coating on a substrate according to one example of an embodiment of the present invention.

FIG. 2 is a diagram illustrating the coating on a substrate of FIG. 1, including examples of suitable layer material.

FIG. 3 is a schematic diagram illustrating an example of a coater useful for one example of a method for producing a coating on a substrate as shown in FIG. 1.

DETAILED DESCRIPTION OF THE INVENTION

Figure 4:
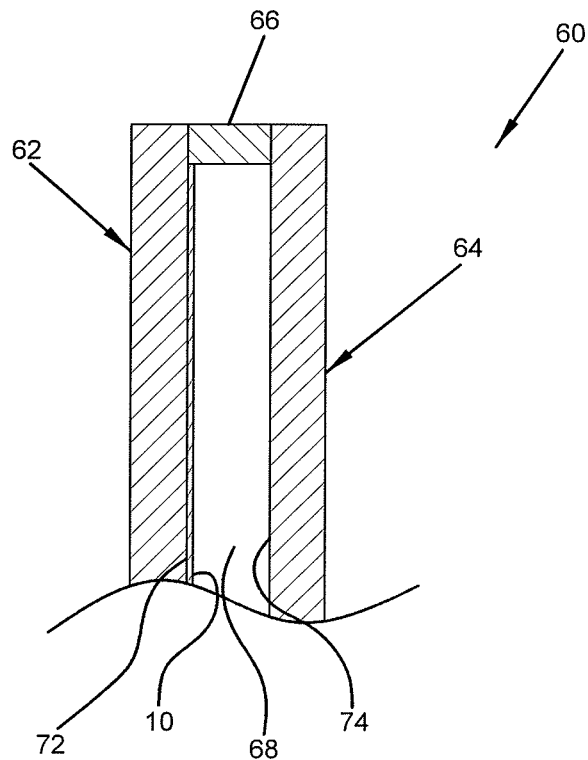
FIG. 4 is a partial cross-sectional view of the coating of FIG. 1 applied to an IG unit according to one example of an embodiment of the present invention.

The invention is generally directed to a substrate having a coating thereon. More particularly, the invention is directed to a substrate 20 having a coating, which may be a low-emissivity coating. Also provided are methods and equipment for depositing the coating.

The substrate 20 may be any transparent, substantially transparent, or light transmissive substrate such as glass, quartz, any plastic or organic polymeric substrate, or any other suitable material or combination of materials. Further, the substrate may be a laminate of two or more different materials and may be a variety of thicknesses. The substrate 20 may also be arranged to include low-emissive properties, apart from a film or coating, such as, for example, as can be accomplished by controlling the iron content in a glass substrate. In one embodiment, the substrate 20 is float glass. Alternatively, the substrate 20 may be a type of glass having low-emissive properties, such as, but not limited to a borosilicate or PYREX™.

The coating 10 may be a thin film coating. To this end, a low-emissivity coating 10 is applied to a surface of a substrate 20. As described herein, the coating 10 may be one or more low-emissivity coatings and may be a microscopically thin, virtually invisible, metal layer or metal oxide layer or plurality or combination of said layers deposited on a substrate 20 surface. The low-emissivity coating 10 may be transparent or substantially transparent to visible light, and may be opaque or substantially opaque to infrared radiation. To this end, the coating 10 on the substrate 20 surface may be formed of low-emissive material and alternatively may be arranged to allow for varying amounts of, for example, solar gain by varying the amount of visible light and/or radiation permitted to pass through the substrate 20. The low-emissivity coating 10 has the general properties of reflecting radiant infrared energy, thus tending to keep radiant heat on the same side of the glass from which it originated.

The coating 10 may be arranged in a layer system as shown in FIG. 1. In an example of an embodiment, the layer system is composed of a plurality of layers on or otherwise attached to the substrate 20. To this end, the film region may be a single layer or a plurality of layers. Thus, one or more of the films or a plurality of film regions may form the coating 10 of an example of an embodiment. The film regions are provided in the form of layers. The thickness of the layer or layers may be uniform, or may vary. Likewise, the thickness of an individual layer may vary across its width or length. In one example, the film region or a portion thereof may have or include a gradual change or graded thickness across at least a portion thereof. For example, the layer may, in some instances, increase in thickness or decrease in thickness with increasing distance from the substrate. The one or more layers may be provided in a contiguous relationship, that is directly on top of or adjacent to another layer or the substrate.

One or more layers of the coating 10 may include or be based on metallic oxides and may be applied to one or more surfaces of the substrate 20. In this regard, as can be seen in FIG. 1, a bottom oxide layer 22, a middle oxide layer 30 and a top oxide layer 36 are provided. These oxide layers each form generally a transparent dielectric film region which is applied over a surface or over a reflective region or layer. Useful dielectric film materials include oxides of zinc, tin, indium, bismuth, titanium, hafnium, zirconium, and alloys thereof, as well as silicon nitride and/or silicon oxynitride. While oxides are specifically referenced herein, alternative dielectric materials may be suitable for purposes of the present invention. In the examples provided herein, and as shown in FIG. 2, the dielectric layers or oxide layers may be formed of zinc oxide (ZnO), tin oxide ($SnO_2$) or mixtures thereof. To this end, an oxide layer or transparent dielectric film region may be formed of or include a zinc tin oxide mixture. A dielectric film region may be a single layer of a single dielectric material or may include two or more layers of the same or different dielectric materials. It should be understood that throughout the specification reference is made to metal oxides. This should not be considered limited to fully oxidized metal oxides but also those species that can form an agglomeration and have partial oxidation states. They can be designated as a M(metal)ox(oxide), e.g., Tiox, Snox, etc.

The bottom oxide layer 22 may have a thickness ranging from about 360A to about 400A (A=angstroms). The middle oxide layer 30 may have a thickness ranging from about 550A to about 700A. The top oxide layer 3.6 may have a thickness ranging from about 110A to about 140A. In this regard, the middle oxide layer 30 has a thickness which is greater than the thickness of the top and bottom oxide layers 36, 22. From an optics standpoint the top oxide and Tiox layer can be treated as single layer.

As can be seen in FIGS. 1-2, the bottom oxide layer 22, substantially identical to that described above, is deposited or placed or otherwise attached on a surface of the substrate 20. The bottom oxide layer 22 may be formed of any suitable material, and in the example shown in FIG. 2 includes zinc oxide and/or tin dioxide ($ZnO/SnO_2$) within the layer.

The bottom oxide layer 22 may be in contiguous relationship, or direct physical contact with a face of a film region 24, or may be separated therefrom. In an example of an embodiment, the second layer may include or be composed of a substance, such as a ceramic, polymer, or metal, which could be an alloy or a super alloy. More specifically, the second layer may be a nickel-based alloy or super alloy, or an austenitic nickel-based alloy or super alloy. More preferably, the alloy or super alloy may be a nickel/chromium/molybdenum (hereinafter an "NCM") alloy, for example INCONEL™, such as INCONEL™ 625. Inconel™ 625 is an NCM alloy composed of Ni (about 58% minimum), Cr (about 20 to about 23%), Mo (about 8 to about 10%), Nb+Ta (about 3.15 to about 4.15%) and Fe (about 5% maximum) by weight. Typical Properties of Inconel™ 625 include a density of 8.44 g/cm³, a melting point of about 1350° C., a co-efficient of expansion of 12.8 μm/m° C. (20-100° C.), a modulus of rigidity of 79 kN/mm², and a modulus of elasticity of 205.8 kN/mm². Inconel™ 625 is covered by the following standards: BS 3076 NA 21, ASTM B446 and AMS 5666. Inconel™ 625 is available from, and is the tradename of Special Metals Corporation of Huntington, W. Va. For purposes of the examples provided herein, INCONEL™ may be obtained for use in any suitable form. INCONEL is available in several different alloys, although alternative forms will not depart from the overall scope of the present invention. Inconel™ 625 is equivalent to: W.NR 2.4856 (Multi-Alloys cc, South Africa), UNS N06625 (Sandmeyer Steel Co., Philadelphia, Pa.) and is also known as AWS 012 as well as under common trade names of Chronin® 625, Altemp® 625, Haynes® 625, Nickelvac® 625 and Nicrofer® 6020.

Accordingly, adjacent the bottom oxide layer 22, as can be seen in FIGS. 1-2, is a second, or NCM alloy layer 24. The NCM layer 24 may be deposited on the bottom oxide layer 22 or otherwise attached thereto. The NCM layer 24 may have a thickness ranging from about 30A to about 150A. The NCM layer may form an infrared reflection region or may form a portion thereof. The NCM alloy may advantageously form an oxide layer when heated and retain strength over a wide temperature range. While NCM alloys are specifically described, other alloys or super alloys suitable for use in high temperature applications which may have one or more of oxidation and corrosion resistant properties or are otherwise suited for extreme environments or have excellent mechanical strength and creep resistance at high temperature, and/or good surface stability may be acceptable for use with the present invention. NCM alloys may be sputtered in an inert atmosphere to provide a layer composition which may be applied to the substrate 20.

In addition to an alloy or super alloy layer, a metal layer or film 26 may also be applied. To this end, a metal such as a silver, a copper, or a gold, and alloys thereof may be applied to the substrate 20, and more particularly to the substrate 20 with one or more layers thereon. Accordingly, as shown in FIG. 1, contiguous with the NCM film region 24 or layer is a metal layer 26 forming an infrared reflective film region. This film region 26 may include a suitable reflection material, and in particular an infrared-reflection material, such as but not limited to silver, gold and/or copper, as well as alloys thereof. The metal layer in one example is a silver layer 26. In an example of an embodiment, the reflection film is formed of silver or silver combined with another material, such as another metal including, but not limited to copper, gold, platinum, palladium. The material is formed into a composition which may be applied as a layer or film 26 to the substrate 20 or layers thereon. The silver layer 26 may likewise be deposited on the NCM alloy layer 24 or otherwise attached thereto. Accordingly, as can be seen in FIGS. 1-2, the NCM alloy layer 24 is positioned between the bottom oxide layer 22 and a first silver layer 26. The metal layer or silver layer 26 may have a thickness ranging from about 80A to about 150A.

A protective or barrier layer 28 may also be optionally provided (see FIG. 1). The barrier layer 28 may be deposited on the silver layer 26 or otherwise attached thereto. In one embodiment, the barrier 28 may be formed of a material which is readily oxidized. To this end, as shown in FIG. 2, the barrier 28 may be a layer of titanium metal or may be a titanium oxide (or a portion thereof may be a titanium oxide). In an example of an embodiment, as shown in FIGS. 1-2, the barrier layer 28 may be contiguous with a reflective film region 26. To this end, the silver layer of FIGS. 1-2 may be positioned between the NCM alloy layer 24 and a first barrier layer 28, such as a titanium layer.

The middle oxide layer 30, formed as described in detail herein, may be provided contiguous to the barrier layer. To this end, the barrier layer 28, as shown in FIG. 1, may be further positioned between the first silver layer 26 and the middle oxide layer 30. The middle oxide layer 30 is deposited or otherwise attached to the barrier layer.

A second or additional metal layer or infrared reflective film region 32, substantially similar to the reflective film region 26 or first silver layer discussed above, may also be provided and applied to the substrate 20 or layers thereon. The second metal or second silver layer 32, as shown in FIGS. 1-2, is positioned adjacent the middle oxide layer 30 and may be deposited or otherwise attached to the middle oxide layer 30. More specifically, the second or additional metal layer 32 may be provided contiguous with the middle oxide layer 30. The second silver layer 32 may have a thickness ranging from about 80A to about 150A. The second or additional metal layer 32 is substantially as described with respect to metal layer 26 discussed hereinabove and will, therefore, not be discussed in further detail herein.

An additional protective or barrier layer 34 may be provided contiguous with, and may be deposited or otherwise attached to the second silver layer 32 (see FIG. 1). The second barrier 34 layer may have a thickness suitable to help protect the coating. The second barrier 34 layer is substantially as described with respect to barrier layer 28, and will therefore not be discussed in further detail herein.

The second barrier 34 layer may be positioned between the second silver layer and the top oxide layer 36 (see FIG. 1). The top oxide layer 36 is described in detail hereinabove. The top oxide layer 36 may be contiguous with and may further be deposited or otherwise attached on the barrier layer 34.

The top oxide layer 36 may also optionally carry or include an overcoat 38 attached to a surface and may be contiguous therewith (see FIG. 1). In this regard the top oxide layer 36 may be positioned between the second barrier 34 layer and the overcoat 38. The overcoat 38 may be composed of or include a metal such as titanium or may be formed of a titanium oxide (TiOx) as shown in FIG. 2. The overcoat 38 of the coating layers may have a thickness ranging from about 130A to about 150A. The overcoat 38 may have a surface which is exposed or otherwise facing the environment in which the substrate 20 with coating 10 thereon is placed.

According to the foregoing arrangement, a substrate 20 has deposited on its surface a sandwich-type arrangement of film layers forming a coating 10, including an NCM alloy layer 24 below a first silver layer 26, which is below a second silver layer 32. The coating 10 layers further may include a bottom oxide layer 22 between the NCM alloy layer 24 and the substrate 20, a middle oxide layer 30 between the first and second silver layers 26, 32, and a top oxide layer 36 above the second silver layer. Barrier layers 28, 34 may also be provided between the silver layers and oxide layers. While the foregoing layers are described as being contiguous, it is contemplated that materials or layers may be placed between the respective layers suitable for the intended purposes of the coating without departing from the overall scope of the present invention.

The foregoing described coating 10 may be used with any transparent, substantially transparent, or light transmissive substrate 20. The substrate 20 may be used in a variety of arrangements and settings where control of reflectance and transmittance is required or desired. In one example of an embodiment, the substrate 20 may be used as, or form a window or skylight. To this end, the coating 10 may be combined with a window pane. The window pane may also have unique properties, such as insulating properties. Accordingly, as shown in FIG. 4, in one example of an embodiment, the low-emissivity coating 10 is applied to a surface of an insulating glass or IG window unit 60. As shown, the IG unit 60 may be a multi-pane window having a first pane, or sheet of glass 62, and a second pane, or sheet of glass 64, sealed at their peripheral edges by a conventional sealant 66 to form a chamber 68 therebetween. By sealing the peripheral edges of the glass sheets 62, 64 and introducing a low-conductance gas, such as argon, into the chamber 68, a typical, high insulating value IG unit is formed. In one example of an embodiment, the coating 10 may be applied on an inner surface 72 of glass sheet 62 within the chamber 20, as illustrated, or alternatively on inner surface 74 of the glass sheet 64 within chamber 20 (not shown). In this respect, it is to be appreciated that FIG. 4 illustrates only one embodiment of an IG unit in which the coating of the present disclosure may be employed. For example, the coatings of the present disclosure may applied to an IG unit having more than two panes of glass.

In some embodiments, the low-emissivity coating 10 may be a thin coating on the substrate 20 or window pane within its airspace that reflects thermal radiation or inhibits its emission, reducing heat transfer through the glass. The low-emissivity coating 10 may thus be positioned on an interior surface or face of the glass or may be located on the outside pane of the glass and may further be provided with additional features, such as but not limited to a film or a body tint which can be used to further reflect solar radiation, or may also include polarizing materials. The substrate 20 may be further retained by a window frame. The window frame may likewise have unique features, such as an insulated window frame that minimizes conductive heat transfer.

A variety of methods may be used to apply the coating 10, or the films or layers forming the coating described herein. In an example of a method of forming a coating 10 on a substrate having a surface is provided. This surface may be optionally prepared by suitable washing or chemical preparation. A coating 10 may be deposited on the surface of the substrate. The coating 10 may be deposited in one or more of a series of discrete layers, or as a thickness of graded film, or combinations thereof. The coating 10 can be deposited using any suitable thin film deposition technique.

In one example of an embodiment, sputtering may be used to deposit or apply the coating on the substrate. As is known, sputtering is a technique used to deposit thin films of a material onto a surface or substrate. By first creating a gaseous plasma and then accelerating the ions from this plasma into some source material (i.e., a target), the source material is eroded by the arriving ions via energy transfer and is ejected in the form of neutral particles, either individual atoms or clusters of atoms or molecules. As these neutral particles are ejected they travel in a straight line unless they come into contact with something, whether it is another particle or a nearby surface. A substrate placed in the path of these ejected particles will be coated by a thin film of the source material or target. As is known, a gaseous plasma is a dynamic condition where neutral gas atoms, ions, electrons and photons exist in near balanced state simultaneously. One can create this dynamic condition by metering a gas, such as argon or oxygen into a pre-pumped vacuum, chamber and allowing the chamber pressure to reach a specific level and then introducing a live electrode into this low pressure gas environment using a vacuum feed through. An energy source, such as RF, DC, MW may be used to feed and thus maintain the plasma state as the plasma loses energy into its surroundings. The type of sputtering used may be diode sputtering, magnetron sputtering, confocal sputtering, direct sputtering or other suitable techniques.

In the example provided herein of a method of depositing the coating 10, DC magnetron sputtering is used. Magnetron sputtering involves transporting a substrate 20 through a series of low pressure zones in which the various film regions that make up the coating 10 are sequentially applied. Thus, the metallic films are sputtered from metallic sources or targets, which may occur in an inert atmosphere. To deposit transparent dielectric film or oxide layers, the target may be formed of the dielectric itself. Alternatively, the dielectric film may also be applied by sputtering a metal target in a reactive atmosphere. In this regard, for example to deposit zinc oxide, a zinc target can be sputtered in an oxidizing atmosphere. The thickness of the deposited film may be controlled by varying the speed of the substrate and/or by varying the power placed upon the targets. In an alternative embodiment of a method for depositing thin film on a substrate, plasma chemical vapor deposition may be used. Such plasma chemical vapor deposition involves the decomposition of gaseous sources via a plasma and subsequent film formation onto solid surfaces, such as glass substrates. The film thickness can be adjusted by varying the speed of the substrate as it passes through a plasma zone and/or by varying the power and/or gas flow rate within each zone.

In one example of a method for depositing a coating 10, a coater, represented generally by 40 in FIG. 3, is used to deposit a coating in the arrangement described herein which may include, in sequence from the substrate 20 surface outward toward an exposed environment, a first transparent dielectric film region or bottom oxide layer 22, a super alloy region 24, a first infrared-reflection film region or silver metal region 26, a first barrier 28 region, a second transparent dielectric film region or middle oxide layer 30, a second infrared-reflection film region or silver metal region 32, a second barrier 34 region, a third transparent dielectric film region or top oxide layer 36, and an outermost layer or overcoat 38. A suitable coater is a architectural glass coater available from Applied Films. Generally, a coater with a minimum of 22 cathode positions and the ability to achieve vacuum of approximately $10^{-6}$ torr is desirable.

Referring to FIG. 3, to accomplish the foregoing coating arrangement, the substrate 20 is positioned at the beginning of the coater 40 and conveyed, by conveyor assembly (not shown), into the first coat zone 42, and then subsequently through a plurality of additional proximally positioned coat zones. It is understood that conveying may be accomplished by any suitable means, mechanical, computerized, or by hand operation. In one example, the conveyance of the substrate may be by transport rollers on a conveyor assembly. Each coat zone may be provided with one or more sputtering chambers or bays adapted to collectively deposit a film region on the substrate. In each of the bays are mounted one or more targets including a sputterable target material. In the examples provided herein, the target may be a compound of zinc or tin, or a metal or metal compound.

The first coat zone 42 is provided with three sputtering chambers (or "bays") which are adapted collectively to deposit a first transparent dielectric film region or bottom oxide layer 22 comprising zinc tin oxide. All three of these bays are provided with sputtering targets comprising a compound of zinc or tin. The number and type of sputtering targets, i.e., planar or cylindrical, and the like, can be varied for manufacturing or other preferences. The targets are sputtered in an oxidizing atmosphere to deposit the first transparent dielectric film region or bottom oxide layer 22 in the form of an oxide film comprising zinc and tin having a thickness of between about 365A and about 400A.

The substrate is then conveyed into a second coat zone 44 wherein an NCM alloy layer 24 and a silver layer 26 forming a first infrared-reflection film region are applied directly over or contiguous with the first transparent dielectric film region or bottom oxide layer 22. The second coat zone 44 is provided with an inert atmosphere. In one example, the inert atmosphere includes argon, although alternative inert gases may be used without departing from the overall scope of the present invention. The active sputtering bays of this coat zone each have a target. The number and type of target, i.e., planar or cylindrical or the like, can be changed for purposes suitable to the manufacture or otherwise as desired. The first target in a bay may be an NCM alloy target. The target in the subsequent or adjacent bay may be a metallic silver target. The target in a further subsequent bay may be a metallic titanium target. As with the first coat zone 42, the substrate is conveyed beneath the NCM alloy target, thereby depositing the NCM alloy in the form of a film having a thickness of between about 30A and about 40A. The substrate is then conveyed under the silver target, depositing the silver in the form of a film having a thickness of between about 90A and about 120A. As a result, the first infrared-reflection film region is deposited in the form of an NCM alloy film and a silver film contiguous therewith, having a thickness of between about 120A and about 160A. The substrate is then conveyed beneath the titanium target in the next bay, thereby depositing a first barrier 28 region in the form of a film comprising titanium and having a thickness suitable to protect the silver layer 26 from oxidation.

The substrate is subsequently conveyed through a third coat zone 46 and a fourth coat zone 48, in which zones the second transparent dielectric film region or middle oxide layer 30 is applied in the form of an oxide film comprising zinc and tin. The third and fourth coat zones 46, 48 each have three active sputtering bays. The third and fourth coat zones 46, 48 are substantially similar to that described with respect to the first coat zone 42, and sputtering occurs substantially as described with respect to the first coat zone 42. In this regard, the oxidizing atmospheres in the third and fourth coat zones 46, 48 may each consist of or include oxygen. Alternatively, one or more of these atmospheres can comprise argon and oxygen. The targets of coat zone three may include first and second zinc targets in adjacent bays and a tin target which forms the third target in a third bay in the coat zone. The targets may be formed of any suitable type, such as a planar or cylindrical target or the like, or may be provided in any number suitable for the purposes provided. The fourth coat zone 48 may include a first bay with a tin target and two subsequent bays with zinc targets, forming second and third targets. The substrate is conveyed beneath all of the noted targets in coat zones three and four 46, 48, such that the second transparent dielectric film region or middle oxide layer 30 is applied in the form of an oxide film comprising zinc and tin and having a thickness between about 600A and about 700A.

Following the fourth coat zone 48, the substrate is conveyed through a fifth coat zone 50 which has two active sputtering bays. In the fifth coat zone 50 the second infrared-reflection film region or silver layer 32 is applied directly over or contiguous with the second transparent dielectric film region or middle oxide layer 30. Sputtering occurs substantially as described with respect to the first infrared-reflection film region. In this regard, the fifth coat zone 50 has an inert atmosphere, which may be formed by argon gas. The sputtering bays in this coat zone each have a target. The target may be a planar target or cylindrical target or the like. Each bay may also include a plurality of targets. The target in the first bay is a metallic silver target, and the target in the adjacent chamber is a metallic titanium target. The metallic titanium target forms barrier layer 34. The substrate is conveyed beneath the target in the first bay to deposit the second infrared-reflection film region as a metallic silver film having a thickness of between about 95A and about 110A. The substrate is then conveyed at the same rate beneath the metallic titanium target in the adjacent bay to deposit a second barrier 34 film region comprising titanium.

The substrate is then conveyed through a sixth coat zone 52 where the third transparent dielectric film region or top oxide layer 36 is applied. The coat zone in the example provided has two sputtering bays, and each such bay is provided may be provided with one or more targets. The targets may be any suitable shape or type as described herein and may comprise a sputterable material that is a compound of zinc or tin. The coat zone 52 is provided with an oxidizing atmosphere including oxygen. Alternatively, this atmosphere may comprise argon and oxygen. The substrate is conveyed beneath these targets in coat zone 52 such that the third transparent dielectric film region or top oxide layer 36 is applied as an oxide film comprising zinc and tin and having a thickness of between about 110A and about 135A.

The substrate is conveyed into a seventh coat zone 54 and an eighth coat zone 56, wherein the outermost portion of the third transparent dielectric film region or top oxide layer, namely, the overcoat 38, is applied. The seventh and eighth coat zones 54, 56 each have two sputtering bays, and each contain an oxidizing atmosphere consisting essentially of oxygen. Alternatively, this atmosphere may comprise argon, nitrogen and/or oxygen. The sputtering bays in each of these coat zones are each provided with one or more targets of any type, such as but not limited to cylindrical or planar targets. Each of these targets comprises a sputterable target material of titanium or a titanium oxide. The substrate is conveyed beneath all of the targets in seventh and eighth coat zones such that the overcoat layer 38 or portion of the third transparent dielectric film region or top oxide layer 36 is applied as a titanium oxide film comprising and having a thickness of between about 125A and about 145A.

It is understood that while a specific arrangement and number of coat zones and active sputtering bays may be described, there may be unused bays and/or coat zones positioned between one or more of the above-described zones and bays. Likewise, alternative positions, numbers and variations of the various components may be used without departing from the overall scope of the present invention. Furthermore, while magnetron sputtering is specifically described, in an alternative example of a method of applying a coating 10, the coating 10 may be preformed and applied to a substrate 20, such as by an adhesive. Alternatively, the coating 10 or properties thereof may be integrally formed with the substrate 20.

EXAMPLES

The following examples are presented as illustrations of the coating 10 and method of applying a coating 10 on a substrate and are not intended to limit the overall scope of the present invention.

As can be seen from the following examples, the coating 10 and method of application of the coating 10 described herein provides reduced light transmission from existing low-emissive coating 10 and provides appropriate exterior color.

The coating 10 having the properties described herein were tested according to National Fenestration Rating Council (NFRC) methods following NFRC 200-2004[E1A4] Procedure for Determining Fenestration Product solar heat Gain Coefficient and Visible Transmittance at Normal Incidence, which is hereby incorporated by reference in its entirety. The coating 10 was also tested in accordance with NFRC 301-2004 Standard Test Method for Emittance of Specular Surfaces Using Spectrometric Measurements, which is hereby incorporated by reference in its entirety. As can be seen from the following Tables and FIGS. 5, 6 and 7, results are listed using color space values, or Hunter Lab, including % transmission (T) or transmission in the a-axis of transmitted color (T ah); transmission in the b-axis of transmitted color (T bh); % reflectance glass side (RG); reflectance glass side in the a-axis (RG ah); reflectance glass side in the b-axis (RG bh); % reflectance film side (RF); reflectance film side in the a-axis (RF ah); reflectance film side in the b-axis (RF bh). The color values (Tah, Tbh, RGah, RGbh, RFah and RFbh) are relative numbers on the Hunter Lab Color Space. ASTM C1649-08 Standard Practice for Instrumental Transmittance Measurement of Color for Flat Glass, Coated and Uncoated and ASTM C1650-07 Standard Practice for Instrumental Reflectance Measurement of Color for Flat Glass, Coated, and Uncoated. The ah values represent the green (−ah) to red (+ah) and the bh values represent the blue (−bh) to yellow (+bh). T, RG, and RF values are % (either % transmission (T) or % reflection (RG and RF).

Examples 1 Through 5

The Examples 1-5 listed in Tables 1 and 2 below, provide five different iterations (Examples 1 through 5) of the coating layer system which have differing amounts of visible light transmission and associated properties. The amount of NCM alloy deposited in each example has been varied. The coatings were all produced in accordance with the depositing methods disclosed herein, and with the set up (power levels) as shown below. The higher the power the more NCM alloy was deposited. Inconel™ 625 was used as the NCM alloy. An argon atmosphere was used with for the metal zones, a oxygen atmosphere was used for the metal oxide zones and a mixture of oxygen and nitrogen was used for the overcoat layer. Actual layer thickness during production trials were not measured, but power levels and line speeds are monitored to determine how much material is being deposited. This work was performed on a 24 chamber, BOC design, architerural glass coater.

Table 2 further includes, for purposes of comparison, performance data analogous to that of Examples 1-5 for a conventional double silver coating and a conventional triple silver coating. Particularly, the double silver coating is a VE-2M coating, and the triple silver coating is a VNE-63, each of the coatings commercially available from Viracon, Inc., of Owatonna, Minn. The performance characteristics for the conventional double and triple silver coatings were computed according to the software program WINDOW 5.2.

TABLE 1

| Metal | Example 1 | Example 2 | Example 3 | Example 4 | Example 5 |
|---|---|---|---|---|---|
| Ti | 78 kW | 78 kW | 78 kW | 78 kW | 78 kW |
| Ti | 78 kW | 78 kW | 78 kW | 78 kW | 78 kW |
| Ti | 78 kW | 78 kW | 78 kW | 78 kW | 78 kW |
| Ti | 78 kW | 78 kW | 78 kW | 78 kW | 78 kW |
| Ti | 78 kW | 78 kW | 78 kW | 78 kW | 78 kW |
| Sn | 19 kW | 19 kW | 19 kW | 19 kW | 19 kW |
| Zn | 19 kW | 19 kW | 19 kW | 19 kW | 19 kW |
| Ti | 4.0 kW | 4.0 kW | 4.0 kW | 4.0 kW | 4.0 kW |
| Ag | 8.2 kW | 8.2 kW | 8.2 kW | 8.2 kW | 8.2 kW |
| Zn | 34 kW | 34 kW | 34 kW | 34 kW | 34 kW |
| Zn | 34 kW | 34 kW | 34 kW | 34 kW | 34 kW |
| Sn | 34 kW | 34 kW | 34 kW | 34 kW | 34 kW |
| Sn | 34 kW | 34 kW | 34 kW | 34 kW | 34 kW |
| Zn | 34 kW | 34 kW | 34 kW | 34 kW | 34 kW |
| Zn | 34 kW | 34 kW | 34 kW | 34 kW | 34 kW |
| Ti | 4.0 kW | 4.0 kW | 4.0 kW | 4.0 kW | 4.0 kW |
| Ag | 5.6 kW | 5.6 kW | 5.6 kW | 5.6 kW | 5.6 kW |
| INCONEL 625 | 13.6 kW | 9.2 kW | 7.5 kW | 5.8 kW | 4.3 kW |
| Zn | 33 kW | 33 kW | 33 kW | 33 kW | 33 kW |
| Sn | 33 kW | 33 kW | 33 kW | 33 kW | 33 kW |
| Zn | 33 kW | 33kW | 33 kW | 33 kW | 33 kW |

TABLE 2

| | Example 1 | Example 2 | Example 3 | Example 4 | Example 5 | Double Ag | Triple Ag |
|---|---|---|---|---|---|---|---|
| Color & Emissivity (Monolithic[1]) | | | | | | | |
| T | 24.69 | 37.11 | 43.61 | 48.92 | 55.22 | 79.10 | 69.92 |
| Tah | −6.78 | −7.41 | −7.48 | −7.08 | −5.67 | −3.62 | −4.11 |
| Tbh | −1.89 | −1.54 | −0.81 | −0.14 | 0.70 | 2.74 | 3.77 |
| RG | 21.87 | 15.40 | 12.73 | 11.05 | 9.09 | 6.00 | 6.12 |
| Rgah | −2.93 | −3.58 | −3.34 | −3.20 | −0.61 | 1.76 | −0.08 |
| RGbh | 0.18 | −3.59 | −5.76 | −6.69 | −8.34 | −1.73 | −2.04 |
| RF | 14.98 | 7.90 | 5.76 | 4.71 | 4.11 | 4.67 | 3.14 |
| RFah | 6.68 | 10.99 | 11.90 | 10.85 | 5.16 | −1.93 | 0.97 |
| RFbh | −9.04 | −9.99 | −10.19 | −10.15 | −6.84 | 1.01 | −2.17 |
| Emissivity | | | | | | 0.03 | 0.04 | 0.032 |
| Performance (IG Unite[2]) | | | | | | | |
| Transmittance | | | | | | | |
| Visible Light (%) | 21.8 | 32.6 | 38.4 | 43.1 | 48.7 | 70 | 62 |
| Solar Energy (%) | 8.4 | 13.0 | 15.5 | 17.6 | 20.44 | 32 | 23 |
| Ultraviolet (%) | 2.0 | 3.3 | 4.0 | 4.6 | 5.3 | 10 | 4 |
| Reflectance | | | | | | | |
| Visible exterior (%) | 23.2 | 17.1 | 14.6 | 13.3 | 11.8 | 11 | 10 |
| Visible interior (%) | 26.2 | 14.4 | 12.6 | 11.8 | 11.3 | 12 | 11 |

TABLE 2-continued

|  | Example 1 | Example 2 | Example 3 | Example 4 | Example 5 | Double Ag | Triple Ag |
|---|---|---|---|---|---|---|---|
| Solar energy (%) | 25.3 | 23.8 | 24.0 | 24.4 | 26.5 | 31 | 36 |
| NFRC U-Value | | | | | | | |
| Winter | 0.292 | 0.293 | 0.292 | 0.294 | 0.291 | 0.29 | 0.29 |
| Summer | 0.259 | 0.260 | 0.258 | 0.261 | 0.256 | 0.26 | 0.25 |
| Shading Coefficient. (SC) | 0.160 | 0.218 | 0.246 | 0.270 | 0.299 | 0.44 | 0.32 |
| Solar Heat Gain Coefficient (SHGC) | 0.143 | 0.189 | 0.212 | 0.233 | 0.259 | 0.38 | 0.28 |

Figure 5:
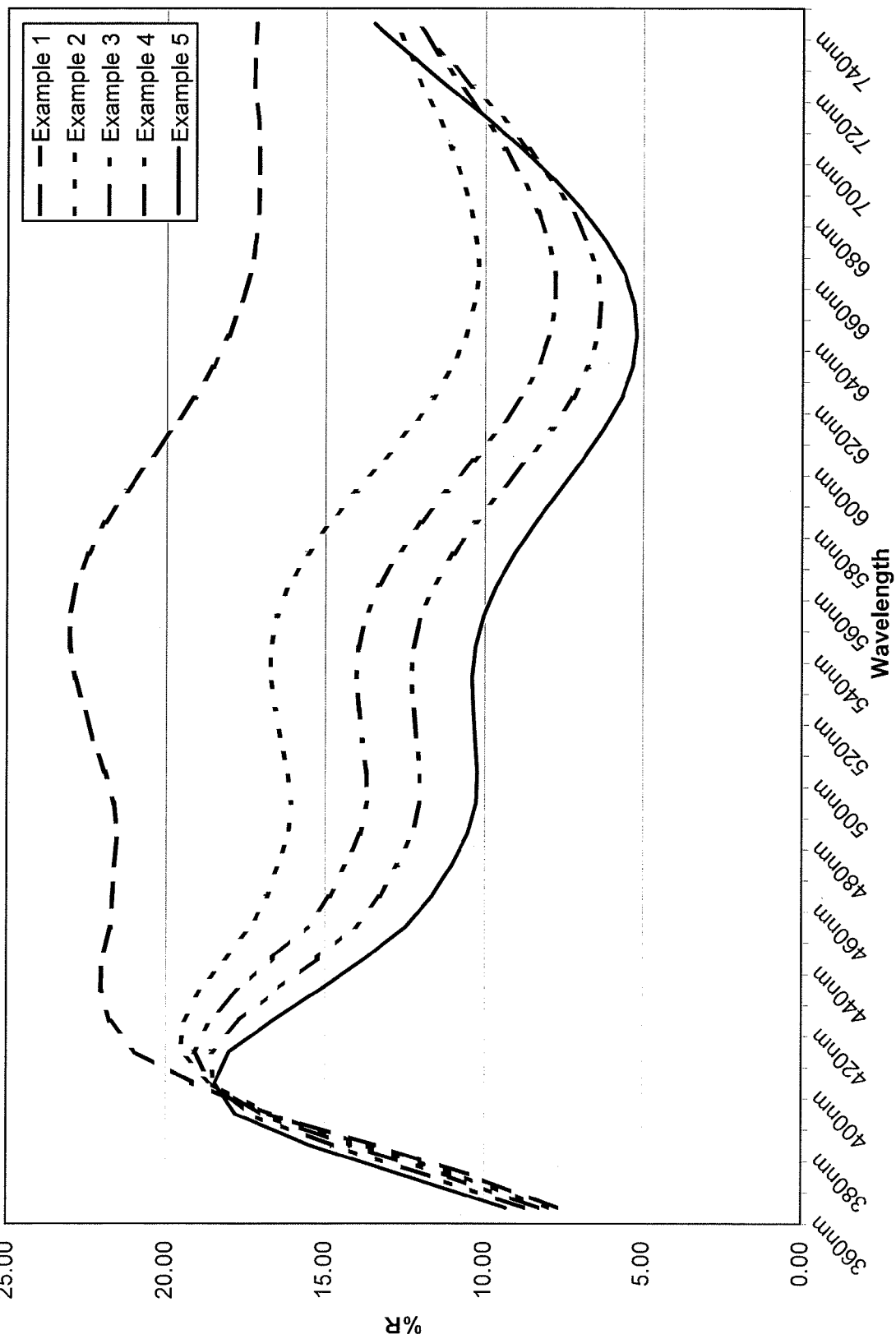
FIG. 5 is a graph, showing glass side reflection values at various wavelengths ranging from 380 nm to 780 nm of samples of the described coating with increasing amounts of a nickel-chromium-molybdenum alloy. Example 1 has the thickest layer, while Example 5 has the thinnest.
Figure 6:
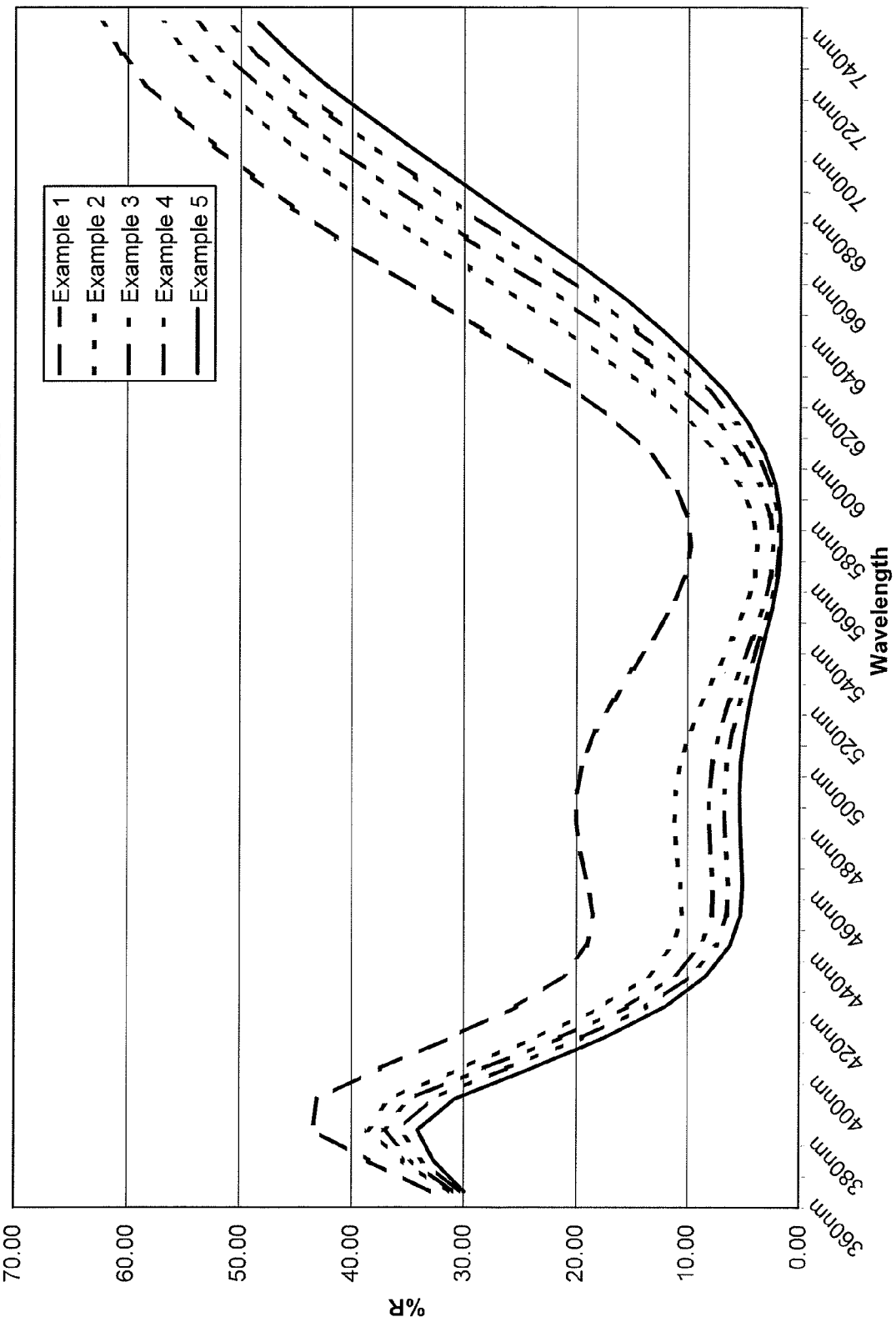
FIG. 6 is a graph, showing film side reflection curves for Examples 1 through 5.
Figure 7:
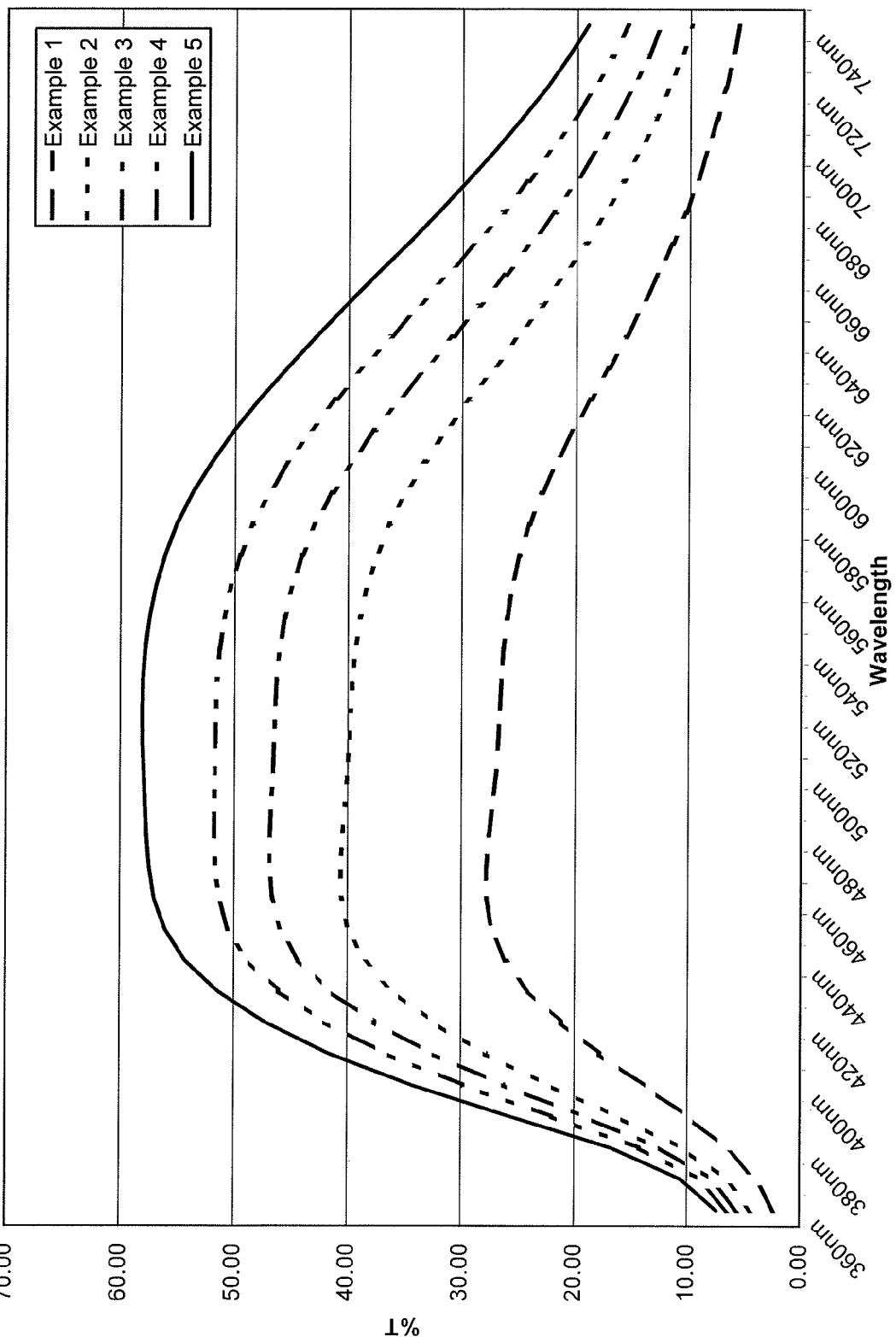
FIG. 7 is a graph, showing transmission curves for Example 1 through 5.

[1] monolithic glass is ¼" clear with coating on the #2 surface
[2] IG unit consists of ¼" clear with coating on the #2 surface - ½" air space - ¼" clear glass FIGS. 5, 6 and 7 provide glass side reflection values, film side reflection curves, and transmission curves for Examples 1 through 5.

The foregoing coating and method provides advantages over currently available coated substrates, particularly substrates coated with conventional double silver and triple silver coatings. As can be seen by the foregoing examples, particularly with respect to Example 5, by the addition of an alloy or super alloy material, such as an NCM alloy, to a double silver coated substrate, performance superior to that of a conventional double silver coated substrate, and comparable to that of a conventional triple silver coated substrate, can be achieved while maintaining desired color levels. More specifically, the coated substrates of the present disclosure have an emissivity comparable to that of conventional triple silver coatings, while maintaining a two-silver layer design. This is particularly advantageous given that it allows for depositing of the coating using an 8 chamber coating machine, as opposed to the much larger and more costly 8+ chamber coating machines required for conventional triple silver coatings. Moreover, the coated substrates of the present disclosure have a desirable, dominant blue appearance (i.e., a $b_h$ color coordinate value of −8.34) as opposed to the undesirable, dominant green appearance of conventional triple silver coated substrates. Still further, as can be seen by the foregoing examples, particularly Example 5, an IG unit coated in accordance with the present disclosure has an improved SHGC value relative to both the conventional double and triple silver coated IG units, while maintaining a desirable visual light transmittance (~50%).

As indicated, the low-emissivity coating 10 may be transparent or substantially transparent to visible light, and may be opaque or substantially opaque to infrared radiation. To this end, the coating 10 on the substrate 20 surface formed of the low-emissive material described may reflect a significant amount of radiant heat, thus lowering the total heat flow through the glass. The low-emissivity coating may also, therefore, be arranged to allow for high solar gain, for moderate solar gain, or for low solar gain, by varying the amount of visible light and/or radiation permitted to pass through the substrate 20. The coating further includes a visible light transmission in the range of about 20% to about 50%. Furthermore, the coating provides a Light to Solar Gain Ratio (LSG) (visible Light Transmittance divided by the Solar Heat Gain Coefficient) of approximately 1.9.

The coating also provides ease of manufacturing and ease of control of the color of the coating as compared to other coatings with comparable performance. The coating layer system also minimizes the potential for color inconsistency when viewed perpendicular to the glass surface or at acute angles. To this end, the coating appeals to a wide range of designs and building applications.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. An article comprising a substrate and a coating applied to the substrate, the coating comprising a plurality of layers, wherein at least one of the layers comprises a Nickel-Chromium-Molybdenum alloy and at least two additional layers comprise silver, wherein the alloy comprises about 58% or more Ni, about 20 to about 23% Cr, about 8 to about 10% Mo, about 3.15 to about 4.15% Nb+Ta and a maximum of about 5% Fe by weight, and wherein the article has a $b_h$ color coordinate value of about −7 to about −11 as measured in Hunter Lab color space.

2. The article of claim 1, wherein the plurality of layers is arranged such that the layer comprising the alloy is positioned between the substrate and at least one of the at least two additional layers comprising silver.

3. The article of claim 1, wherein the layer comprising the alloy has a thickness ranging from about 30 to about 150 angstroms.

4. The article of claim 1, wherein the plurality of layers comprises, from the substrate outwardly:
 a) a bottom metal oxide layer;
 b) the at least one alloy layer;
 c) a first silver layer of the at least two additional silver layers;
 d) a middle metal oxide layer;

e) a second silver layer of the at least two additional silver layers; and f) a top metal oxide layer.

5. The article of claim 4, wherein the bottom oxide layer, the middle oxide layer and top oxide layer comprise an oxide selected from the group consisting of a zinc oxide, a tin oxide, and a zinc tin oxide.

6. The article of claim 4, wherein the first silver layer has a thickness ranging from about 80 to about 150 angstroms, the second silver layer has a thickness ranging from about 80 to about 150 angstroms, the bottom oxide layer has a thickness ranging from about 360 to about 400 angstroms, the middle oxide layer has a thickness ranging from about 550 to about 700 angstroms, and the top oxide layer has a thickness ranging from about 110 to about 140 angstroms.

7. The article of claim 4, wherein the plurality of layers further comprises an overcoat layer.

8. The article of claim 4, further comprising a first barrier layer positioned between the first layer silver layer and the middle oxide layer and a second barrier layer positioned between the second silver layer and the top oxide layer.

9. The article of claim 1, wherein the article has an emissivity value of about 0.030 to about 0.039.

10. An insulating glass unit comprised of:
at least two substantially parallel, spaced sheets of glass, said two sheets of glass being sealed together at their peripheral edges thereby to define an insulating chamber therebetween,
a coating applied to a surface of one of said glass sheets within said insulating chamber, wherein said coating comprises a plurality of layers, and wherein the plurality of layers comprises:
an alloy layer comprising a Nickel-Chromium-Molybdenum alloy, wherein the alloy comprises about 58% or more Ni, about 20 to about 23% Cr, about 8 to about 10% Mo, about 3.15 to about 4.15% Nb+Ta and a maximum of about 5% Fe by weight; and
at least one and no more than two silver layers;
wherein the insulating glass unit has a $b_h$ color coordinate value of about −7 to about −11 as measured in Hunter Lab color space.

11. The insulating glass unit of claim 10, wherein the insulating glass unit has an SHGC (or solar heat gain coefficient) of about 0.140 to about 0.300.

12. The insulating glass unit of claim 10, wherein the insulated glass unit has an emissivity of about 0.030 to about 0.039.

13. The insulating glass unit of claim 10, wherein the plurality of layers comprises, from the surface of the sheet of glass to which the coating is applied outwardly:

a) a bottom metal oxide layer;
b) the alloy layer;
c) a first silver layer of the at least one and no more than two silver layers,
d) a middle metal oxide layer;
e) a second silver layer of the at least one and no more than two silver layers;
f) a top metal oxide layer.

14. The insulating glass unit of claim 13, wherein:
a) the bottom metal oxide layer has a thickness ranging from about 360 to about 400 angstroms;
b) the alloy layer has a thickness ranging from about 30 to about 150 angstroms;
c) the first silver layer has a thickness ranging from about 80 to about 150 angstroms;
d) the middle metal oxide layer has a thickness ranging from about 550 to about 700 angstroms;

e) the second silver layer has a thickness ranging from about 80 to about 150 angstroms; and
f) the top metal oxide layer has a thickness ranging from about 110 to about 140 angstroms.

15. A method of coating a substrate, the coating comprising a plurality of layers, wherein at least one of the layers comprises a Nickel-Chromium-Molybdenum alloy material and at least two additional layers comprise silver materials, wherein the alloy material comprises about 58% or more Ni, about 20 to about 23% Cr, about 8 to about 10% Mo, about 3.15 to about 4.15% Nb+Ta and a maximum of about 5% Fe by weight, and wherein the coated substrate has a $b_h$ color coordinate value of about −7 to about −11 as measured in Hunter Lab color space, the method comprising:
applying a layer comprising the Nickel-Chromium-Molybdenum alloy material by sputtering;
applying a first silver layer of the at least two additional silver layers by sputtering; and
applying a second layer of the at least two additional silver layers by sputtering.

16. The method of claim 15, wherein the applying steps occur in a coater having a plurality of coating zones and the substrate is conveyed within the coater through the plurality of coating zones.

17. The method of claim 16, wherein:
a bottom oxide layer is applied by sputtering a plurality of targets comprising at least one zinc target and at least one tin target;
the alloy material is applied by sputtering a target of alloy to deposit the alloy material;
the first layer of silver material is applied by sputtering a target of silver to deposit the first silver layer;
a middle oxide layer is applied by sputtering a plurality of targets comprising at least one zinc target and at least one tin target;
the second silver material is applied by sputtering an additional target of silver to deposit the second silver layer; and
a top oxide layer is applied by sputtering a plurality of targets comprising at least one zinc target and at least one tin target.

18. The method of claim 17, wherein:
the layer of the Nickel-Chromium-Molybdenum alloy material is applied at a thickness ranging from about 30 to about 150 angstroms,
the first layer of silver material is applied at a thickness ranging from about 80 to about 150 angstroms,
the second layer of silver material is applied at a thickness ranging from about 80 to about 150 angstroms,
the bottom oxide layer is applied at a thickness ranging from about 360 to about 400 angstroms,
the middle oxide layer is applied at a thickness ranging from about 550 to about 700 angstroms, and
the top oxide layer is applied at a thickness ranging from about 110 to about 140 angstroms.

19. The method of claim 17, further comprising:
applying a first barrier layer comprising titanium between the first silver layer and the middle oxide layer by sputtering;
applying a second barrier layer comprising titanium between the second silver layer and the top oxide layer by sputtering.

20. The method of claim 19, further comprising applying an overcoat to the top oxide layer by sputtering a target comprising titanium to deposit the overcoat comprising a titanium material following the application of the top oxide layer.

* * * * *